H. J. PUCKETT & V. LUCAS.
GRAIN DRYING APPARATUS.
APPLICATION FILED JUNE 21, 1912.

1,039,440.

Patented Sept. 24, 1912.

2 SHEETS—SHEET 1.

Witnesses
Frank R. Glow
M. K. Preston

Inventors:
V. Lucas and H. J. Puckett
By George S. Thorpe Atty.

Inventors:
V. Lucas and H. J. Puckett

UNITED STATES PATENT OFFICE.

HUGH J. PUCKETT AND VALENTINE LUCAS, OF KANSAS CITY, MISSOURI.

GRAIN-DRYING APPARATUS.

1,039,440. Specification of Letters Patent. Patented Sept. 24, 1912.

Application filed June 21, 1912. Serial No. 705,122.

*To all whom it may concern:*

Be it known that we, HUGH J. PUCKETT and VALENTINE LUCAS, citizens of the United States, residing at Kansas City, in the county of Jackson and State of Missouri, have invented certain new and useful Improvements in Grain-Drying Apparatus, of which the following is a specification.

This invention relates to grain drying apparatus, and has for its object to produce an apparatus of this character which will perform its function efficiently and reliably and which is of comparative simple, durable and inexpensive construction.

To this end the invention consists in certain novel and peculiar features of construction and organization as hereinafter described and claimed; and in order that it may be fully understood reference is to be had to the accompanying drawing, in which:—

Figure 2:
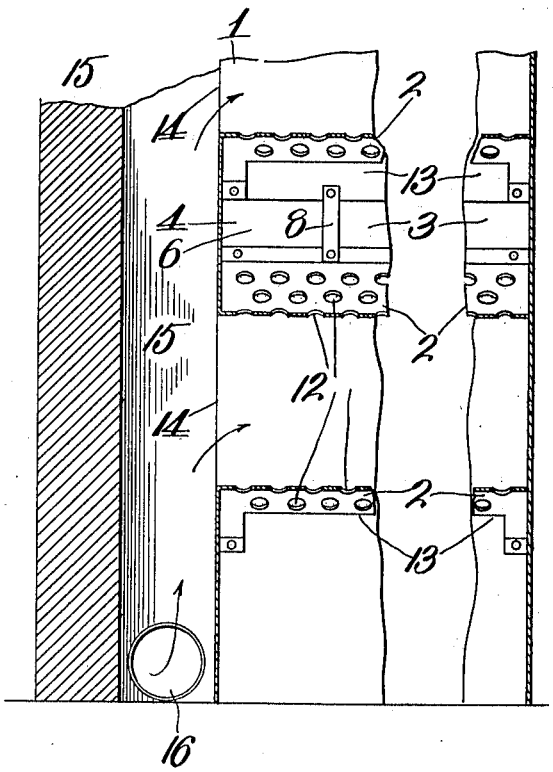
Figure 1:
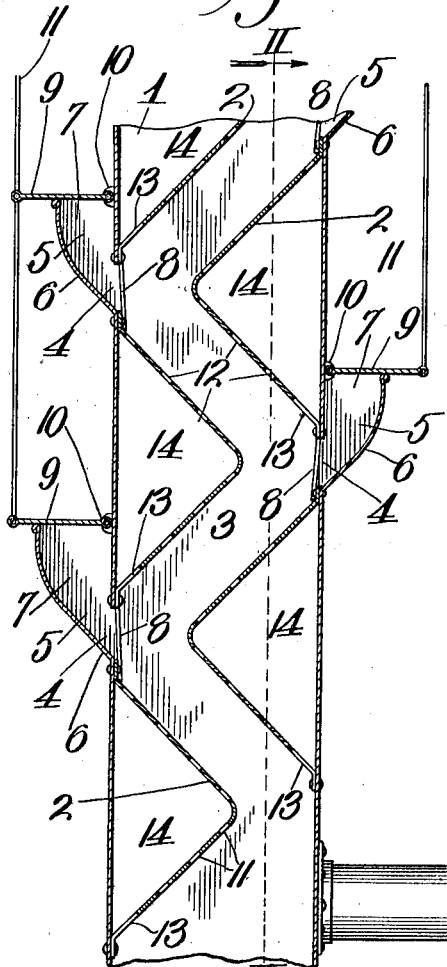
Figure 3:
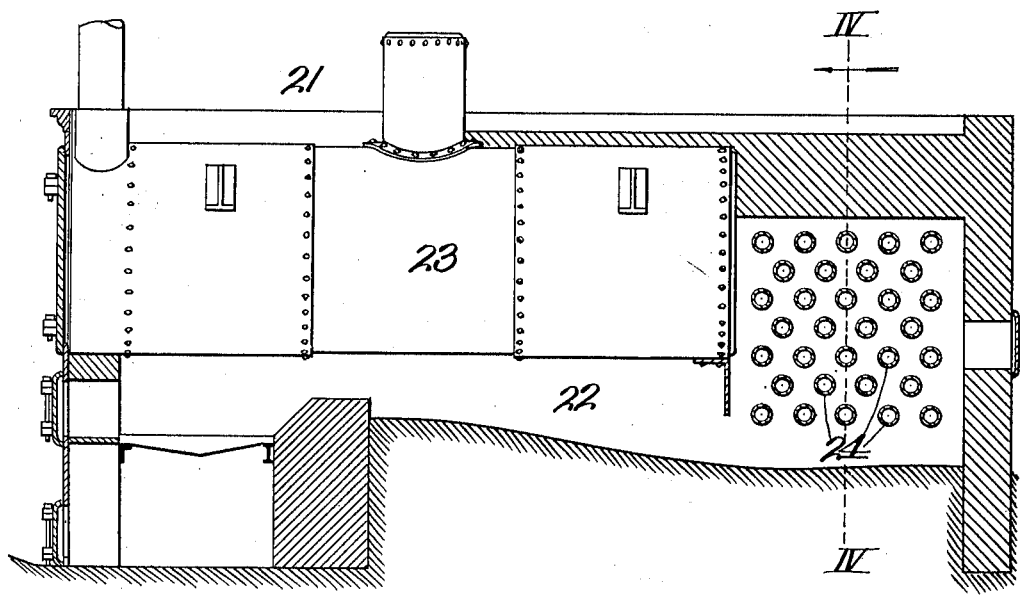
Figure 4:
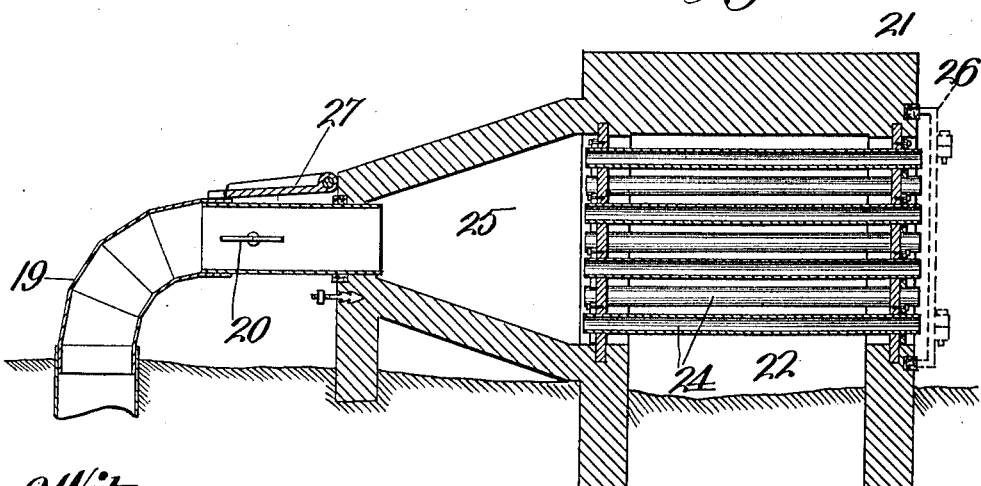

Figure 1, is a view partly in central vertical section and partly in elevation, of the grain drying chute and the blower of apparatus embodying the invention. Fig. 2, is a vertical section taken through the grain chute on the line II—II of Fig. 1, and also shows a hot air chamber of the apparatus, communicating with said chute. Fig. 3, is a view partly in section and partly in elevation of an appliance for heating the air discharged by the blower into the hot air chamber. Fig. 4, is a section on the line IV—IV of Fig. 3.

In the said drawings 1 is a rectangular chute constructed preferably of sheet metal, and provided internally with a staggered series of V-shaped partitions 2, the apices of which extend horizontally, and the partitions are of such proportion that they overlap and thus conjointly provide or form a tortuous channel 3. Each side wall of the chute, between adjacent partitions, is provided with an opening 4, communicating at its lower end with each opening is a short air stack 5, the inner sides of the same being formed by the adjacent side wall of the stack, the outer sides by extensions 6 of the underlying sections of said walls, which extensions form in effect a continuation of the upper portion of the adjacent partition, and the ends by portions 7 connecting the ends of the extensions with said walls, and the openings 4 are bridged by one or more bars 8, to brace and stiffen the side walls of the chute adjacent said openings. Controlling the exit of air through said air stacks are valves or doors 9, hinged at 10 to the side walls, and pivotally connected together by rods 11, whereby all of the valves or doors at one side of the chute may be simultaneously operated.

The partitions are perforated as shown at 12, and their lower portions are cut away to provide exit openings 13, for grain which may pass from the tortuous passage into the spaces inclosed by the partitions, in order that all of the grain entering the chute shall pass through the same without interruption.

One end wall of the chute is provided with a staggered series of openings 14 corresponding in area to and registering with the spaces inclosed by the partitions, and all of said openings 14 communicate with a hot air chamber 15, supplied by a pipe 16, leading from a blower 17 of common and well known type, that is to say, a blower consisting of a casing of circular form containing a rotary fan or wheel 18, and said blower receives its air from a pipe 19 provided with a damper 20. For heating the air supplied to pipe 19, an ordinary boiler furnace 21 is utilized, 22 indicating the combustion chamber and 23 the boiler, our preferred construction being to secure a series of air tubes 24 in the combustion chamber at the rear end of the boiler, one end of each tube communicating with the atmosphere and the other end with a chamber 25 from which pipe 19 leads.

When the use of the furnace is not desired for heating air, the receiving ends of the tubes 24 are closed as by a cap 26, (shown by dotted lines) and a door 27 may be utilized to close the outer end of chamber 25, or the same may be closed by the damper 20, if pipe 19 is not withdrawn from said chamber.

In operation, the hot air and flames come into contact with tubes 24 before passing through the boiler of the furnace, and that the air is drawn by the blower into chamber 25 and thence passes through the pipe 19, the blower casing, and pipe 16 into the hot air chamber 15, and from the latter passes through the openings 14 and through the perforated partitions into a mass or stream of grain descending through the tortuous channel. By this arrangement the grain will be thoroughly dried and warmed, and the air reduced in temperature by contact with the grain, will escape through the stacks 5, it being understood that such stacks are necessary as the grain will pile up therein to a limited extent, but will not back up into the same sufficiently to overflow them. During this operation of drying the grain, the valves or doors will be opened more or less accordingly as the grain is very damp and descending the chute of the tortuous passage in large volume, or is fairly dry and descending the tortuous passage in a comparatively thin stream, the requisite adjustment of the valves or doors being according to the experience of the person in control.

From the above description it will be apparent that we have produced a grain drying apparatus embodying the features of advantage enumerated as desirable, and it may be modified in minor particulars without departing from the principle of construction defined by the appended claims.

We claim:

1. In a grain drying apparatus, a chute, provided in opposite walls with openings arranged in staggered relation and with upstanding stacks exterior to said walls and communicating at their lower ends with said openings, foraminous partitions of substantially V-shape, secured to and projecting from the walls in opposite directions between the openings of their respective walls and inclosed by the chute and arranged in overlapping relation to form a tortuous channel, and means for discharging heated air into the spaces inclosed by said partitions.

2. In a grain drying apparatus, a chute, provided in opposite walls with openings arranged in staggered relation and with upstanding stacks exterior to said walls and communicating at their lower ends with said openings, foraminous partitions of substantially V-shape, secured to and projecting from the walls in opposite directions between the openings of their respective walls and inclosed by the chute and arranged in overlapping relation to form a tortuous channel, means for discharging heated air into the spaces inclosed by said partitions, and valves or doors controlling the upper ends of the stacks.

3. In a grain drying apparatus, a chute, provided in opposite walls with openings arranged in staggered relation and with upstanding stacks exterior to said walls and communicating at their lower ends with said openings, foraminous partitions of substantially V-shape, secured to and projecting from the walls in opposite directions between the openings of their respective walls and inclosed by the chute and arranged in overlapping relation to form a tortuous channel, means for discharging heated air into the spaces inclosed by said partitions, valves or doors controlling the upper ends of the stacks, and means connecting vertically alined valves or doors for transmitting movement from one to the other thereof.

4. In a grain drying apparatus, a chute, provided in opposite walls with openings arranged in staggered relation and with upstanding stacks exterior to said walls and communicating at their lower ends with said openings, foraminous partitions of substantially V-shape, secured to and projecting from the walls in opposite directions between the openings of their respective walls and inclosed by the chute and arranged in overlapping relation to form a tortuous channel, means for heating air, a hot air chamber communicating with all of the spaces inclosed by said partitions, a blower, a pipe receiving the air heated by the heater and discharging it into the blower, and a pipe for conducting the air from the blower to the hot air chamber.

In testimony whereof we affix our signatures, in the presence of two witnesses.

HUGH J. PUCKETT.
VALENTINE LUCAS.

Witnesses:
C. L. TIMMONS,
JOHN M. KELLEY.